(12) United States Patent
Werries et al.

(10) Patent No.: US 8,777,329 B2
(45) Date of Patent: Jul. 15, 2014

(54) WHEEL CARRIER OF A MOTOR VEHICLE

(75) Inventors: Hartmut Werries, Bissendorf (DE); Metin Ersoy, Walluf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 458 days.

(21) Appl. No.: 13/131,066

(22) PCT Filed: Nov. 26, 2009

(86) PCT No.: PCT/DE2009/050065
§ 371 (c)(1),
(2), (4) Date: Jun. 29, 2011

(87) PCT Pub. No.: WO2010/060424
PCT Pub. Date: Jun. 3, 2010

(65) Prior Publication Data
US 2011/0248555 A1    Oct. 13, 2011

(30) Foreign Application Priority Data

Nov. 27, 2008 (DE) .......................... 10 2008 044 136

(51) Int. Cl.
| | |
|---|---|
| B60B 27/00 | (2006.01) |
| B60B 27/02 | (2006.01) |
| F16C 35/06 | (2006.01) |
| F16C 35/00 | (2006.01) |
| F16C 35/04 | (2006.01) |
| F16C 19/02 | (2006.01) |
| F16C 19/18 | (2006.01) |
| F16C 33/58 | (2006.01) |
| F16C 35/067 | (2006.01) |

(52) U.S. Cl.
CPC ........... *F16C 35/067* (2013.01); *B60B 27/0026* (2013.01); *B06B 27/0005* (2013.01); *F16C 19/184* (2013.01); *F16C 33/58* (2013.01); *F16C 2326/02* (2013.01); *A16C 35/077* (2013.01)
USPC ...... 301/105.1; 301/5.309; 301/5.7; 384/544; 384/561; 384/585; 29/898.061; 29/898.07

(58) Field of Classification Search
USPC ............. 301/105.1, 5.309, 5.7; 384/544, 561, 384/585, 589, 903; 29/898.061, 898.07, 29/898.04
See application file for complete search history.

(56) References Cited

U.S. PATENT DOCUMENTS 4,909,523 A * 3/1990 Olson ...................... 280/11.225
5,058,262 A * 10/1991 Brockmuller et al. .......... 29/725
(Continued)

FOREIGN PATENT DOCUMENTS

| DE | 100 61 663 A1 | 6/2002 |
|---|---|---|
| DE | 101 50 613 A1 | 4/2003 |

(Continued)

*Primary Examiner* — Paul N Dickson
*Assistant Examiner* — George Spisich
(74) *Attorney, Agent, or Firm* — Davis & Bujold, PLLC; Michael J. Bujold

(57) ABSTRACT

A wheel carrier for a motor vehicle in which the wheel carrier is typically manufactured from aluminum. The wheel carrier comprises a recess (1) for receiving an outer ring (2) of a wheel bearing (3). An inner ring (4) of the wheel bearing (3) is fixed in a hub (15) of a wheel flange (12) of a vehicle axle. An axial end of the outer ring (2) of the wheel bearing (3) abuts against a shoulder of the wheel carrier (6), and a rim section (5) of the wheel carrier (6) is at least partially deformed to abut an opposite axial end of the outer ring (2) of the wheel bearing (3).

15 Claims, 3 Drawing Sheets

(56) References Cited

U.S. PATENT DOCUMENTS

| | | | |
|---|---|---|---|
| 5,674,011 A * | 10/1997 | Hofmann et al. | 384/448 |
| 5,755,517 A * | 5/1998 | Nicot | 384/448 |
| 5,762,559 A * | 6/1998 | Jacob et al. | 464/145 |
| 6,142,578 A * | 11/2000 | Pawlowski et al. | 301/5.7 |
| 6,250,814 B1 * | 6/2001 | Tajima et al. | 384/544 |
| 6,431,826 B1 * | 8/2002 | Schober | 415/170.1 |
| 6,457,869 B1 * | 10/2002 | Smith et al. | 384/448 |
| 6,523,909 B1 * | 2/2003 | Nakamura et al. | 301/105.1 |
| 6,692,157 B2 * | 2/2004 | Sahashi et al. | 384/537 |
| 6,935,026 B2 | 8/2005 | Frantzen | |
| 6,955,474 B2 | 10/2005 | Barbiero et al. | |
| 7,011,593 B2 * | 3/2006 | Schenk et al. | 474/199 |
| 7,380,334 B2 * | 6/2008 | Ulmann et al. | 29/724 |
| 2002/0015545 A1 | 2/2002 | Griseri et al. | |
| 2004/0252927 A1 * | 12/2004 | Hirai et al. | 384/544 |

FOREIGN PATENT DOCUMENTS

| | | |
|---|---|---|
| DE | 10 2005 032 888 A1 | 1/2007 |
| WO | 03/000508 A1 | 1/2003 |

* cited by examiner

WHEEL CARRIER OF A MOTOR VEHICLE

This application is a National Stage completion of PCT/DE2009/050065 filed Nov. 26, 2009, which claims priority from German patent application serial no. 10 2008 044 136.8 filed Nov. 27, 2008.

FIELD OF THE INVENTION

The invention concerns a wheel carrier of a motor vehicle.

BACKGROUND OF THE INVENTION

To save weight, in the manufacture of motor vehicles it is becoming increasingly frequent to produce individual components or entire assemblies using light metal materials. As light metal materials, magnesium or aluminum are most often used.

For example, from DE 10 2005 032 888 A1 a wheel carrier is known, which is entirely made from the light metal aluminum. A substantial problem, however, relates to the connection of the wheel bearing to the wheel carrier made from a light metal, because the different materials of the wheel carrier and the wheel bearing have different thermal expansion coefficients and also different strengths. In an extreme case this can result in loosening of the wheel bearing in the wheel carrier, with axial drift or movement in the circumferential direction, at the very least with the consequence of disturbing noises in the wheel suspension area. To prevent this, from DE 10 2005 032 888 A1 it is known to provide securing rings which fix the wheel bearing in the wheel carrier. This solution involves the step of providing at least one securing ring which is set into the outer ring of the wheel bearing by friction force and/or positive interlock, so that friction force locking also exists between the surrounding component, i.e. the wheel carrier, and the securing ring. Furthermore the securing ring can have a conical contour or one that rises or is domed relative to the rotation axis, in order, by virtue of the wedge action between the wheel bearing and the wheel carrier, to avoid any relative movement of the wheel bearing.

In the system known from DE 10 2005 032 888 A1 the fitting of the wheel bearing into the wheel carrier is made more difficult by the fact that each securing ring first has to be set into the outer ring of the wheel bearing, before the wheel bearing can be integrated into the wheel carrier. In practice this problem can hardly be solved without heat treating the structural elements. As a result, the production of the structural elements and their assembly entail considerable effort and cost.

Wheel carriers in a form consisting of cast and then additionally forged aluminum, in which an intermediate steel ring is interposed between the outer ring of the wheel bearing and the inside surface of the recess, are already used in vehicles. However, the casting and subsequent forging of the wheel carrier and the insertion of the intermediate steel ring prove to be very expensive.

SUMMARY OF THE INVENTION

The purpose of the present invention is to provide as simple a solution as possible, and one that is uncomplicated in terms of production technology, for connecting a wheel bearing to a wheel carrier of a motor vehicle, which ensures reliable fixing of the wheel bearing within the wheel carrier so that no relative movements take place between the wheel bearing and the wheel carrier.

A motor vehicle wheel carrier made from a light metal material such as aluminum, with a recess for holding the outer ring of a wheel bearing into whose inner ring a hub of a wheel flange of a vehicle axle can be inserted, has been developed further according to the invention in such manner that the wheel bearing is fixed in the wheel carrier by at least partial deformation of a rim section of the recess.

The invention provides a solution which can be produced by very simple technological means and is therefore inexpensive, for fixing a wheel bearing permanently into a wheel carrier.

To connect the wheel carrier and the wheel bearing, if only partial deformations of the rim section of the wheel carrier are carried out along the circumference of the wheel bearing, this thereby fixes the wheel bearing against axial drift out of the wheel carrier and it is also possible to avoid relative movements in the circumferential direction of the wheel bearing, i.e. undesired rotation movements of the wheel bearing within the wheel carrier. The idea here is for example to produce, as viewed in the circumferential direction, a serration-like interlocking between the wheel carrier and the wheel bearing. However, it is also within the scope of the inventive concept that the deformation of the wheel carrier extends completely around the wheel bearing. Thanks to the invention the wheel carrier forging process required in known solutions can be omitted, whereby further simplification is achieved.

A first design version of the invention consists in that the outer ring of the wheel bearing is fixed in the wheel carrier with at least one partial deformation of a rim section of the recess. The fixing of the outer ring of a wheel bearing onto the wheel carrier by partial deformation of a part-area of a rim section of the recess is expedient because the opposite case, namely fixing onto the inner ring of the wheel bearing, involves greater complexity. Accordingly, this solution enables particularly simple fixing of the wheel bearing in the recess of the wheel carrier.

Besides the possibility of setting the wheel bearing directly into the recess of the wheel carrier, objects of the invention are also designs in which an intermediate ring is interposed between the outer ring of the wheel bearing and the inside surface of the recess. However, the intermediate ring should be wider than the wheel bearing and thus contain the wheel bearing completely. Herein lies a quite substantial difference from the designs mentioned in connection with the explanation of the prior art, in which securing rings are used for fixing the wheel bearing. Namely, in the very expedient design according to the invention, the production and fitting of the wheel bearing into the wheel carrier has been decidedly simplified. In addition the use of an intermediate ring for the indirect fixing of the wheel bearing into the wheel carrier enables the wheel bearing to be fixed over its full width. But apart from the advantages already mentioned, this solution also provides the possibility of very simple replacement of the wheel bearing in the event of repair. The wheel bearing does not have to be separated out of the light metal wheel carrier, which could in some cases result in severe damage to the inside surface of the recess, but rather, it can be simply taken out of the intermediate ring. Thus, an essential advantage is that it is not necessary to replace the entire wheel carrier including the wheel bearing present in it. For the customer this has considerable cost advantages, while the ability of the wheel bearing to be replaced also makes things easier for the workshop personnel.

To simplify the connection of the intermediate ring to the wheel carrier and therefore facilitate assembly as well, it is proposed that the intermediate ring should consist of a material with higher strength compared with the light metal material of the wheel carrier. Suitable materials for this could be, for example, ones such as steel, so that the intermediate ring is made from a steel material and the wheel carrier, for example, from aluminum.

For indirect fixing of the wheel bearing in the wheel carrier it is advantageous for the intermediate ring to be fixed by deforming the rim section of the recess. This makes it possible, for example, to produce the intermediate ring together with the wheel bearing as a pre-assembled structural unit and then insert the intermediate ring, together with the already integrated wheel bearing, into the corresponding recess of the wheel carrier. In this solution therefore, it is not the wheel bearing or its outer ring which is fixed by the deformation, but instead the intermediate ring. An important advantage of a pre-assembled structural unit is the possibility of being able to compensate component-related tolerances, in particular between the wheel bearing and the intermediate ring, which results in improved quality of wheel carriers according to the invention.

For safety reasons, according to the invention it can be required or desired that the wheel bearing is additionally fixed in the wheel carrier or in the intermediate ring by a securing ring. Although this measure is not strictly necessary for the secure fixing of the wheel bearing, it can constitute an additional safety factor.

To avoid relative movements between the intermediate ring and the wheel carrier holding it, it is advantageous for the intermediate ring to be inserted in the recess of the wheel carrier with a tight fit. According to the invention this fit can be a transition fit or preferably a press fit, the intermediate ring being inserted into the recess of the wheel carrier with one of these fits.

To improve the firm seating of the intermediate ring in the recess of the wheel carrier, it is proposed that the outer surface of the intermediate ring be knurled. In one design this knurling can be orientated transversely to the circumferential direction of the intermediate ring. A combination of this knurling with additional knurling, for example along and/or obliquely to the circumferential direction is possible and is included in the scope of the inventive concept. The knurling on the one hand enables optimum fixing of the intermediate ring in the wheel carrier, and on the other hand ensures secure and reliable holding over and beyond the full lifetime. This fixing possibility is suitable for avoiding axial drift movements of the intermediate ring and for avoiding movements in the circumferential direction. A further advantage is that even high temperatures in the area of the wheel carrier have no appreciable effect on the firm seating of the components.

According to a further advantageous solution the knurling can consist of various sections, which can alternate as viewed both in the circumferential direction of the intermediate ring and also transversely to the circumferential direction. This provides that in addition to the knurling arranged only on one part of the outer surface of the intermediate ring and extending transversely to its circumferential direction, knurling that extends along and/or obliquely to the circumferential direction of the intermediate ring is also present on another part of its outer surface.

A further solution according to the invention provides that the outer diameter of the intermediate ring on the side thereof that faces the wheel carrier when the intermediate ring is inserted into the wheel carrier, is smaller than on the side facing away from the wheel carrier. This has the advantage that material displacements occurring when the intermediate ring is pressed into the wheel carrier can escape into the area of the intermediate ring's smaller diameter.

Below, the invention is explained in more detail with reference to the attached drawings. The example embodiments shown do not imply any restriction to the variants represented, but serve only to explain the principle of the invention. To be able to make clear the mode of operation according to the invention, the figures show only greatly simplified representations in which components or elements not relevant to the invention have been omitted. This, however, does not mean that such components or elements are not present in a system according to the invention.

DETAILED DESCRIPTION OF THE PREFERRED EMBODIMENTS

Figure 1:
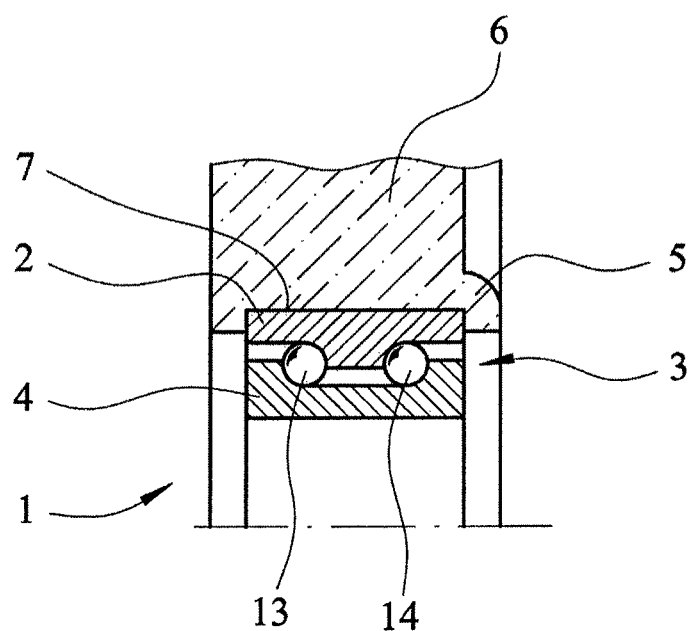
FIG. 1: Partial section through a first embodiment variant of a wheel carrier according to the invention.

The wheel carrier 6 shown in FIG. 1 comprises in this case of a light metal material, namely aluminum. It has a recess 1 into which a hub 15 of a wheel flange 12 of a vehicle axle can be inserted, as shown more clearly in FIG. 3. A wheel bearing 3 is set into the recess 1 of the wheel carrier 6. In a known manner this wheel bearing 3 comprises an outer ring 2 and an inner ring 4, which in this case communicate with one another by way of two series of a plurality of rolling elements 13, 14 so that the inner ring 4 can rotate relative to the outer ring 2. In the example shown the rolling elements 13, 14 are balls. In the embodiment variant shown in FIG. 1 the wheel bearing 6 has been set into the recess 1 of the wheel carrier 6 with a press fit. For this, before being assembled the wheel carrier 6 and the wheel bearing 3, to be set into it, are heat treated. The outer ring 2 of the wheel bearing 3 is now directly in contact with the inside surface 7 of the recess 1 of the wheel carrier 6. Once the wheel bearing 3 has been positioned exactly in the recess 1 of the wheel carrier 6, the rim section 5 of the wheel carrier 6, until then projecting axially relative to the rotation axis of the wheel bearing 3, is deformed so that it fixes the outer ring 2 of the wheel bearing 3 to prevent any drift movement in the axial direction. The rim section 5 of the wheel bearing 6 can be deformed by any simple deformation method, such as a rolling process. Accordingly, the fitting of the wheel bearing 3 into the wheel carrier 6 in this manner is very simple. On the side opposite the rim section 5 the outer ring 2 of the wheel bearing 3 rests on a corresponding shoulder of the wheel carrier 6.

Figure 2A:
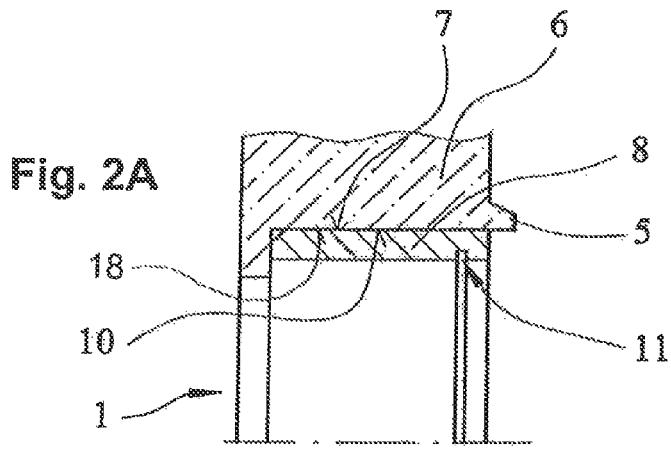
FIGS. 2A-2C: Simplified stage-by-stage plan of the fitting of a wheel bearing into a wheel carrier according to the invention, for a second embodiment variant
Figure 2B:
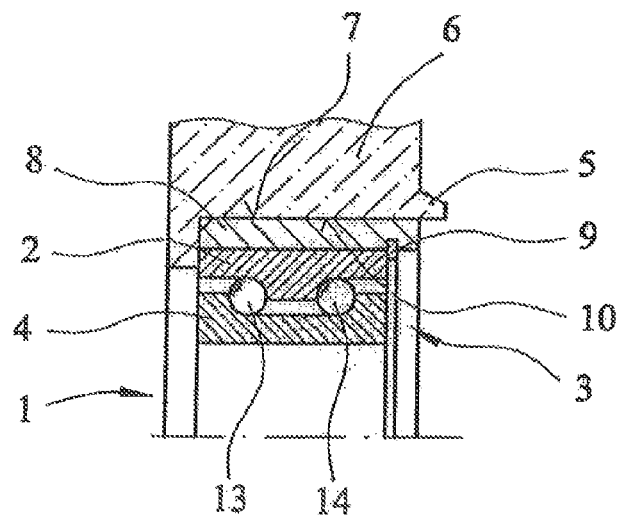
Figure 2C:
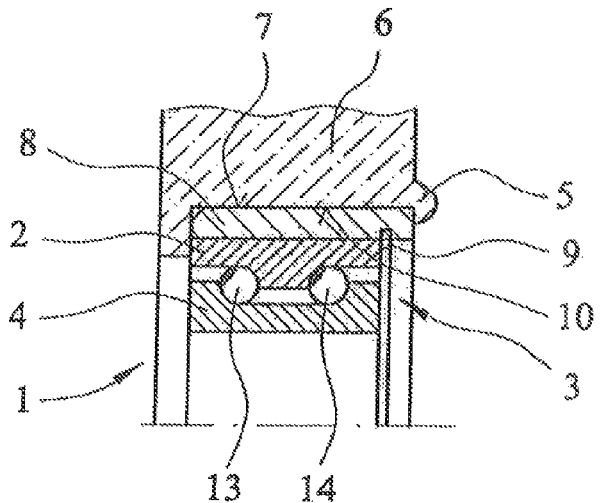

FIGS. 2A-2C show a stage-by-stage process of assembling a second embodiment variant of a wheel carrier according to the invention made of aluminum, for a motor vehicle. In this variant an intermediate ring 8 made of steel is interposed between the outer ring 2 of the wheel bearing 3 and the inside surface 7 of the recess 1.

FIG. 2a shows the pre-assembly condition. Here, the intermediate ring 8 has already been inserted into the recess 1 of the wheel carrier. The intermediate ring 8 is a simple steel ring. Its outer surface 10 is in direct contact with the inside face 7 of the recess 1 of the wheel carrier 6. The outer surface 10 of the intermediate ring 8 comprises knurling 18 (only diagrammatically shown in the figure). Knurling in this area improves the firm seating and fixing of the intermediate ring 8 in the recess 1. In the outer section of the intermediate ring 8 facing away from the fitting direction of the wheel bearing 3 the ring has a groove 11, whose purpose is explained below.

FIG. 2B shows a working step in which the wheel bearing 3 has been inserted in the intermediate ring 8. The outer ring 2 of the wheel bearing 3 is now directly in contact with the inner surface of the intermediate ring 8. The groove 11 holds a securing ring 9, which additionally fixes the wheel bearing 3 in the intermediate ring 8 and also prevents axial drifting out of the wheel bearing 3.

Finally, FIG. 2C shows the wheel carrier according to the invention in its ready-assembled condition. The difference from the previous part b) of the figure is that the rim section 5 of the wheel carrier 6 has now been deformed so as to fix the intermediate ring 8 in the recess 1 of the wheel carrier 6. Deformation is carried out by a rolling process so that the deformation process can be made fully automatic. The advantage of the solution that includes an intermediate ring 8 is that the wheel bearing 3 can be replaced at any time without fear of damage to the wheel carrier 6. For this it is only necessary to release the securing ring 9 so that the wheel bearing 3 can be extracted from the intermediate ring 8 and replaced by a new wheel bearing 3.

Figure 3:
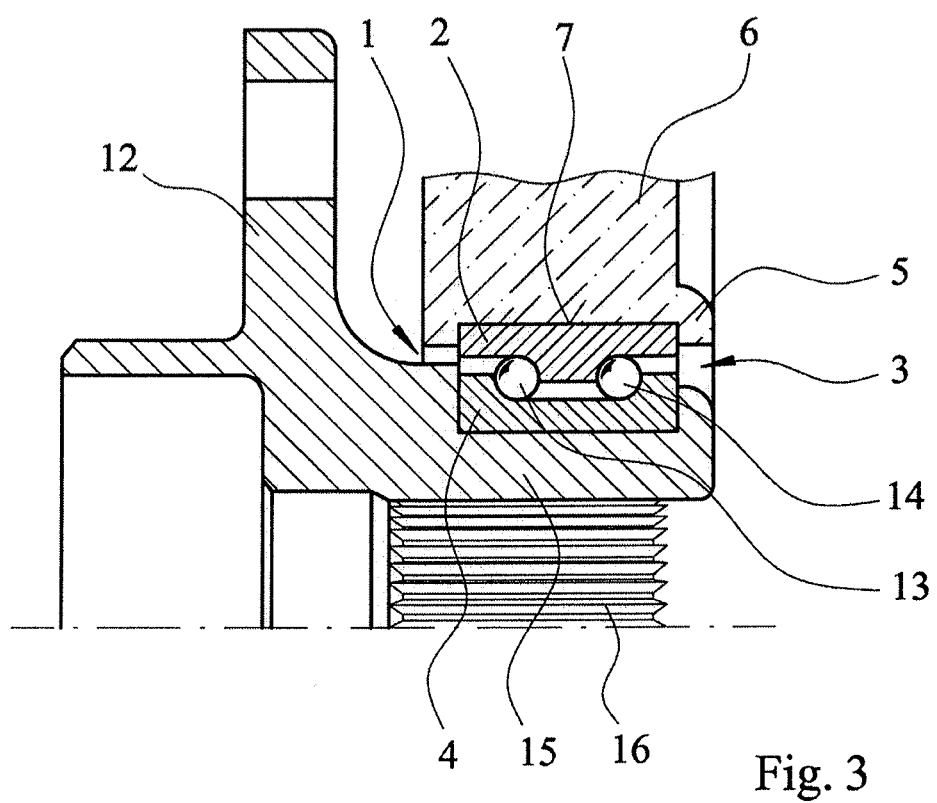
FIG. 3: Section of a wheel carrier fitted in motor vehicle.

FIG. 3 shows a section to make clear the configuration of an assembled wheel carrier 6. In the manner already described in connection with FIG. 1, this holds a wheel bearing 3 whose outer ring 2 is fixed in the wheel carrier 6 made of aluminum by means of the deformed rim section 5. The inner ring 4 of the wheel bearing 3 is fitted into a hub 15 which, for its part, is arranged together with the wheel bearing 3 inside the recess 1 of the wheel carrier 6. The hub 15 is an integral part of a wheel flange 12 and can receive, in a central bore 16 suitable for the purpose, for example the driveshaft of a wheel drive system.

LIST OF INDEXES

1 Recess
2 Outer ring
3 Wheel bearing
4 Inner ring
5 Rim section
6 Wheel carrier
7 Inside surface
8 Intermediate ring
9 Securing ring
10 Outer surface
11 Groove
12 Wheel flange
13 Rolling element (ball)
14 Rolling element
15 Hub
16 Central bore
18 Knurling

The invention claimed is:

1. A wheel carrier, for a motor vehicle, made from a light metal material, the carrier comprising:
   a recess (1) having an inside surface which receives an outer ring (2) and an inner ring of a wheel bearing (3), the inner ring (4) of the wheel bearing receives a hub (15) of a wheel flange (12) of a vehicle axle, and
   an intermediate ring has an inner surface and is fixed between the outer ring of the wheel bearing and the wheel carrier, and the inner surface of the intermediate ring abuts the outer ring of the wheel bearing,
   the outer ring of the wheel bearing (3) being independent of and releasably fixed within the intermediate ring, and the intermediate ring is fixed within the wheel carrier (6) by at least a partial deformation of a rim section (5) of the recess (1), such that the wheel bearing is removable from the intermediate ring while the intermediate ring remains fixed within the wheel carrier.

2. The wheel carrier of the motor vehicle according to claim 1, wherein the intermediate ring (8) is located between the outer ring (2) of the wheel bearing (3) and the inside surface (7) of the recess (1), and the intermediate ring (8) has a width which is larger than a width of the wheel bearing and accommodates the wheel bearing completely.

3. The wheel carrier of the motor vehicle according to claim 2, wherein the intermediate ring (8) is made of a material with greater strength than a strength of the light material of the wheel carrier, and the material of the intermediate ring is a different material than the light material of the wheel carrier.

4. The wheel carrier of the motor vehicle according to claim 2, wherein the intermediate ring (8) is made from steel and the light material of the wheel carrier is aluminum.

5. The wheel carrier of the motor vehicle according to claim 2, wherein the intermediate ring (8) axially abuts a shoulder of the wheel carrier and the deformed rim section (5) of the recess (1).

6. The wheel carrier of the motor vehicle according to claim 5, wherein the wheel bearing (3) is axially fixed by a securing ring (9) in the intermediate ring (8), with one axial end of the outer ring (2) of the wheel bearing (3) abutting the shoulder of the wheel carrier and an opposite axial end of the outer ring of the wheel bearing abutting the securing ring.

7. The wheel carrier of the motor vehicle according to claim 2, wherein the intermediate ring (8) is set into the recess (1) of the wheel carrier (6) by one of a transition fit and a press fit.

8. The wheel carrier of the motor vehicle according to claim 2, wherein the intermediate ring has an outer surface that abuts the inside surface of the recess and the outer surface (10) of the intermediate ring (8) is knurled.

9. The wheel carrier of the motor vehicle according to claim 8, wherein the knurling is orientated transversely to a circumferential direction of the intermediate ring (8).

10. The wheel carrier of the motor vehicle according to claim 9, wherein a first knurling is formed only on a portion of the outer surface (10) of the intermediate ring (8) and runs transversely to the circumferential direction of the intermediate ring (8), and a second knurling extends at least one of along and obliquely to the circumferential direction of the intermediate ring (8) is formed on another portion of the outer surface (10).

11. The wheel carrier of the motor vehicle according to claim 8, wherein an outer diameter of the intermediate ring (8), on a side facing toward the wheel carrier (6) when the intermediate ring (8) is set into the wheel carrier (6), is smaller than on a side facing away from the wheel carrier (6).

12. A wheel carrier for a motor vehicle, the wheel carrier comprising:
   an inside surface that defines a recess;
   an intermediate ring that has radially facing inner and outer surfaces;
   a wheel bearing that has inner and outer rings, the outer ring of the bearing has an exterior surface, and the inner ring of the wheel bearing is fixed to a hub of a wheel flange;
   the intermediate ring is received within the recess of the wheel carrier such that the outer surface of the intermediate ring abuts the inside surface of the wheel carrier, and the wheel bearing is received within the intermediate ring such that the exterior surface of the outer ring of the wheel bearing abuts the inner surface of the intermediate ring;

a first axial end surface of the intermediate ring axially abuts a shoulder of the wheel carrier and a second axially opposite end surface of the intermediate ring abuts a deformed rim section of the wheel carrier such that the intermediate ring is axially fixed with respect to the wheel carrier;

the intermediate ring has an axial length that is greater than an axial length of the wheel bearing; and the outer ring of the wheel bearing is axially fixed by a securing ring within the intermediate ring, such that a first axial end surface of the outer ring of the wheel bearing abuts the shoulder of the wheel carrier and a second axially opposite end surface of the outer ring of the wheel bearing abuts the securing ring.

13. The wheel carrier of the motor vehicle according to claim 12, wherein the first axial end surface of the intermediate ring has a radially outer diameter that is greater than a radially outer diameter of the second axially opposite end surface of the intermediate ring, the difference of the radially outer diameters of the first and the second axial end surfaces of the intermediate ring forms a void that is adjacent the shoulder and defined by the intermediate ring and the wheel carrier, the void receives material that is displaced when the intermediate ring is received into the wheel carrier.

14. The wheel carrier of the motor vehicle according to claim 12, wherein the inner and the outer surfaces of the intermediate ring are cylindrical.

15. The wheel carrier of the motor vehicle according to claim 12, wherein the intermediate ring is formed from a first material and the wheel carrier is formed from a second material that is different than and softer than the first material.

\* \* \* \* \*